US012335164B2

(12) United States Patent
Fitzpatrick et al.

(10) Patent No.: US 12,335,164 B2
(45) Date of Patent: Jun. 17, 2025

(54) TOKENIZATION OF RESOURCE EXCHANGE EVENT INFORMATION

(71) Applicant: BANK OF AMERICA CORPORATION, Charlotte, NC (US)

(72) Inventors: Sean D. Fitzpatrick, Davidson, NC (US); Justin Garrick, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 301 days.

(21) Appl. No.: 17/883,001

(22) Filed: Aug. 8, 2022

(65) Prior Publication Data

US 2024/0048505 A1  Feb. 8, 2024

(51) Int. Cl.
| | |
|---|---|
| *H04L 47/783* | (2022.01) |
| *G06Q 20/40* | (2012.01) |
| *G06Q 40/02* | (2023.01) |
| *H04L 47/70* | (2022.01) |

(52) U.S. Cl.
CPC ......... *H04L 47/783* (2013.01); *G06Q 20/401* (2013.01); *G06Q 40/02* (2013.01); *H04L 47/822* (2013.01); *G06Q 2220/00* (2013.01)

(58) Field of Classification Search
CPC ... H04L 47/783; H04L 47/822; G06Q 20/401; G06Q 40/02; G06Q 2220/00
See application file for complete search history.

(56) References Cited

U.S. PATENT DOCUMENTS

| | | | |
|---|---|---|---|
| 8,245,909 B2 | 8/2012 | Pletz et al. | |
| 8,301,566 B2 | 10/2012 | Mears | |
| 9,928,490 B1 | 3/2018 | Vancini et al. | |
| 10,089,632 B2* | 10/2018 | Hosp | G06Q 20/384 |
| 10,275,764 B2* | 4/2019 | Nwokolo | G06Q 20/36 |
| 10,395,247 B2 | 8/2019 | Gilliam, III et al. | |
| 10,417,396 B2 | 9/2019 | Bawa et al. | |
| 10,990,941 B1 | 4/2021 | Devan et al. | |
| 10,992,679 B1 | 4/2021 | Fakhraie et al. | |
| 11,120,158 B2* | 9/2021 | Hockey | G06Q 40/125 |

(Continued)

OTHER PUBLICATIONS

Dodanduwa, Kavindu, and Ishara Kaluthanthri. "Trust-based identity sharing for token grants." Proceedings of the 3rd International Conference on Cryptography, Security and Privacy. 2019. (Year: 2019).*

(Continued)

*Primary Examiner* — Nathan A Mitchell
(74) *Attorney, Agent, or Firm* — Moore & Van Allen PLLC; Anup Iyer (57) ABSTRACT

Secured system for sharing/distributing a user's resource exchange event information with third-party data recipients. In response to verifying the identity of a user and receiving the user's consent to distribute the resource exchange event information, user inputs are received that define resource exchange event metadata and a resource exchange event token is generated that maps a token identifier to both the resource exchange event processing data and the defined resource exchange event metadata. The token is communicated to and stored by a predetermined third-party data recipient, which presents the token at the time of requesting the processing of a resource exchange event on behalf of the user.

15 Claims, 4 Drawing Sheets

(56) References Cited

U.S. PATENT DOCUMENTS

| | | | |
|---|---|---|---|
| 11,227,064 B1 | 1/2022 | Fakhraie et al. | |
| 11,361,290 B2 | 6/2022 | Bouey et al. | |
| 11,429,649 B2* | 8/2022 | Yu | G06N 5/027 |
| 11,481,838 B1* | 10/2022 | Nguyen | H04L 63/083 |
| 11,599,875 B2 | 3/2023 | Ow et al. | |
| 11,714,689 B2* | 8/2023 | Kiefer | G06F 9/5038 |
| | | | 719/329 |
| 11,803,660 B2* | 10/2023 | Hockey | G06Q 20/02 |
| 2007/0233708 A1* | 10/2007 | Baio | G06F 16/951 |
| 2007/0260636 A1* | 11/2007 | Baio | G06F 16/9574 |
| 2010/0312700 A1 | 12/2010 | Coulter et al. | |
| 2014/0129448 A1* | 5/2014 | Aiglstorfer | G06Q 30/06 |
| | | | 705/44 |
| 2015/0317613 A1* | 11/2015 | Clark | G06Q 20/12 |
| | | | 705/44 |
| 2016/0350747 A1* | 12/2016 | Pruthi | G06Q 20/108 |
| 2017/0078303 A1 | 3/2017 | Wu | |
| 2019/0080402 A1 | 3/2019 | Molinari et al. | |
| 2019/0236590 A1* | 8/2019 | Nwokolo | G06Q 20/12 |
| 2019/0318122 A1* | 10/2019 | Hockey | G06Q 20/3221 |
| 2019/0342295 A1* | 11/2019 | Peterson | H04L 63/08 |
| 2019/0354979 A1 | 11/2019 | Crawford | |
| 2020/0076813 A1* | 3/2020 | Felice-Steele | H04L 63/1441 |
| 2020/0327540 A1* | 10/2020 | Chavarria | G06Q 20/389 |
| 2021/0075782 A1* | 3/2021 | Dunjic | G06F 9/4451 |
| 2021/0084032 A1* | 3/2021 | Ding | G06F 9/54 |
| 2021/0097198 A1* | 4/2021 | Blaikie, III | G06Q 20/3821 |
| 2022/0028012 A1* | 1/2022 | Hockey | H04L 63/0853 |
| 2022/0172207 A1 | 6/2022 | Cella et al. | |
| 2023/0043318 A1* | 2/2023 | Selman | G06F 21/6209 |
| 2023/0096672 A1* | 3/2023 | Bhat | G06Q 40/02 |
| | | | 726/27 |
| 2023/0101530 A1* | 3/2023 | Bhat | G06F 21/645 |
| | | | 726/20 |
| 2023/0230067 A1* | 7/2023 | Upadhye | G06Q 20/4016 |
| | | | 705/65 |
| 2023/0412599 A1* | 12/2023 | Peterson | G06Q 20/00 |

OTHER PUBLICATIONS

Samanthula, Bharath K., et al. "A secure data sharing and query processing framework via federation of cloud computing." Information Systems 48 (2015): 196-212. (Year: 2015).*

* cited by examiner

TOKENIZATION OF RESOURCE EXCHANGE EVENT INFORMATION

FIELD OF THE INVENTION

The present invention is related to distribution of resource exchange event information and, more specifically, the tokenization of resource exchange event processing data and resource exchange metadata/criteria.

BACKGROUND

Third-party data recipients, such as so-called FinTech mobile applications or the like require a user to share resource exchange event processing information, such as automated clearing house (ACH) information, including routing number, account number, wire numbers and the like for purposes of processing resource exchange events, such as payment events on behalf of the user. Historically, a user would provide the third-party data recipients with user credentials (e.g., username, passcode and the like) for accessing one or more network sites (e.g., mobile banking sites or the like) and the third-party data recipients would access the network sites and perform screen scraping to acquire the requisite resource exchange event processing information. Recently, resource holding entities, such as financial institutions have implemented application programming interface (API)-based solutions using industry standards, whereby when a user desires to share their resource exchange event processing information with a third-party data recipient, the user submits consent and subsequently the resource exchange event processing information, such as automated clearing house (ACH) information is communicated to the third-party data recipient.

In both instances, the threat posed by a data breach is significant. For example, if a data breach occurs at the third-party data recipient and the user's resource exchange event processing information becomes compromised, at a minimum the user is required replace the existing resource exchange event processing information with new resource exchange event processing information (e.g., close/open payment accounts) as well take other actions related to downstream affects related to such changes. Moreover, if the user's resource exchange event processing information is not only compromised but also wrongfully used by a malicious actor to conduct a resource exchange event, since many of the third-party data recipients implement irrevocable resource exchange event channels, challenges exist in the user attempting to recover resources used in such wrongful resource exchange events. Additionally, since user's commonly share their resource exchange event processing information with more than one third-party data recipient, if the user's resource exchange event processing information has been determined to have been compromised it may be difficult to determine where the breach occurred (i.e., which third-party data recipient was breached).

Therefore, a need exists to develop systems, methods, computer program products and the like that provide a more secure means for sharing/distributing a user's resource exchange event information with third-party data recipients. In this regard, the desired systems, methods, computer program products and the like should allow for resource exchange event data information to be shared with third-party data recipients and/or allow third-party data recipients to request processing of resource exchange events on behalf of a user, without the user's resource exchange event processing information being prone to compromise. In this regard, desired systems, methods and computer program products should eliminate the need to replace the existing resource exchange event processing information in the event that a data breach occurs at the third-party data recipient. Moreover, the desired systems, methods and computer program products should be able to readily ascertain the source of a data breach if an attempt is made to maliciously perform a resource exchange event using the user's resource exchange event processing information.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for secure means for sharing/distributing a user's resource exchange event information with third-party data recipients. Specifically, in response to verifying the identity of a user and receiving the user's consent to distribute the resource exchange event information, user inputs are received that define resource exchange event metadata, otherwise referred to as criteria and a resource exchange event token is generated that maps a token identifier to both the resource exchange event processing data and the defined resource exchange event metadata. The token is communicated to and stored by a predetermined third-party data recipient, which presents the token at the time of requesting the processing of a resource exchange event on behalf of the user. In this regard, the third-party data recipient never possesses the actual user's resource exchange event processing information. Moreover, since the token is tied to specific use metadata/criteria, any resource exchange event requested by third-party data recipient must meet the defined resource exchange event metadata in order for the resource exchange event to be authorized.

The resource exchange event metadata may be associated with time constraints, volume of resource constraints, frequency of resource exchange events, type of objects/services associated with a resource exchange event, resource exchange event party or type of party and the like.

As a result of the present invention, since the actual user's resource exchange event processing information is not communicated to the third party data recipient, the likelihood of compromise of the user's resource exchange event processing information is greatly diminished, if not eliminated. In this regard, if the token is determined to have been comprised, it may be possible to only replace the token itself, without the need to replace the resource exchange event processing information that is merely mapped to the token. Moreover, if a wrongdoer in possession of token attempts to process a resource exchange event using the token, the processing is likely to be denied since the request is unlikely to meet the criteria defined by the resource exchange event metadata.

A system for distributing resource exchange event data to third-party data recipients defines first embodiments of the invention. The system includes a first computing platform having a first memory and one or more first computing processor devices in communication with the first memory. The first memory stores a token generator module that is executable by at least one of the one or more first computing processing devices. The token generator module is configured to, in response to verifying an identity of a user, receive a first user input that is configured to authorize a resource holding entity to distribute resource exchange event data associated with the user to a third-party data recipient. The token generator module is further configured to receive one or more second user inputs that define resource exchange event processing metadata for conducting one or more user resource exchange events that are requested by the third-party data recipients and participated in by the user. In response to receiving the second user inputs, the token generator module is further configured to generate a virtual token that is configured to map a virtual token identifier to (i) resource exchange event processing data associated with the user, and (ii) the resource exchange event processing metadata. Further, the token generator module is configured to communicate (i) the virtual token to the third-party data recipient, and (ii) mapping data associated with the virtual token to a virtual token mapping database.

The system additionally includes a second computing platform having a second memory and one or more second computing processor devices in communication with the second memory. The second memory stores the virtual token mapping database that is configured to receive the mapping data and maintain a database that stores a mapping of virtual token identifiers to (i) resource exchange event processing data associated with a plurality of users, and (ii) the resource exchange event processing metadata defined by each of the plurality of users for a corresponding third-party data recipient.

In specific embodiments of the system, the token generator module is further configured to (i) receive a third user input that defines the third-party data recipient, or (ii) receive a request from the third-party data recipient for distribution of the resource exchange event data associated with the user.

In other specific embodiments of the system, the token generator module is further configured to generate the virtual token, which is specific to a resource exchange event processing network (e.g., Automated Clearing House (ACH), Real-Time Payment (RTP) or the like) associated with the third-party data recipient.

In still further embodiments of the system, the token generator module is further configured to receive the one or more second user inputs that define the resource exchange event processing metadata, which defines at least one of (i) an expiration date for processing resource exchange events, (ii) a time period for processing resource exchange events, (iii) a frequency for processing resource exchange events, and (iv) a volume of resource exchange events allowed to be processed. In other related embodiments of the system, the resource exchange event processing metadata defines at least one of (i) a specific volume of resources to be processed in a resource exchange event, (ii) a minimum volume of resources to be processed in a resource exchange event, and (iii) a maximum volume of resources to be processed in a resource exchange event. In still further related embodiments of the system, the resource exchange event processing metadata defines at least one of (i) a specific resource receiver or specific type of resource receiver for receiving the resources in a resource exchange event, and (ii) a specific object or service or specific type of object or service being received by the user in a resource exchange event.

In further specific embodiments of the system, the token generator module is further configured to receive a third user input that defines (i) a specific resource holding repository, or (ii) a plurality of resource holding repositories ranked in terms of user preference. In such embodiments of the system, the resource exchange event processing data includes one or more identifiers associated with the specific resource holding repository or the plurality of resource holding repositories.

In additional specific embodiments the system further includes a third computing platform having a third memory and one or more third computing processor devices in communication with the third memory. The third memory stores a resource exchange event processing module that is executable by at least one of the one or more third computing processing devices. The resource exchange event processing module is configured to receive, from the third-party data recipient, a resource exchange event request including the virtual token, and access the virtual token mapping database to identify (i) the user, (ii) the resource exchange event processing data associated with the user, and (iii) the resource exchange event processing metadata. The resource exchange event processing module is further configured to determine whether the request resource exchange event request meets the resource exchange event processing metadata, and, in response to determining that the resource exchange event request meets the resource exchange event processing metadata, (i) distribute resource exchange event data to the third-party data recipient and, (ii) authorize processing of the resource exchange event using the resource exchange event processing data. In related embodiments of the system, the resource exchange event processing module is further configured to, in response to determining that the resource exchange event request does not meet the resource exchange event processing metadata, determine whether to authorize the processing of the resource exchange event and/or implement procedures to determine why the resource exchange event request does not meet the resource exchange event processing metadata.

A computer-implemented method for distributing resource exchange event data to third-party data recipients defines second embodiments of the invention. The computer-implemented method is executed by one or more computing processor devices. The computer-implemented method includes, in response to verifying an identity of a user, receiving a first user input that is configured to authorize a resource holding entity to distribute resource exchange event data associated with the user to a third-party data recipient. In addition, the computer-implemented method includes receiving one or more second user inputs that define resource exchange event processing metadata for conducting one or more user resource exchange events that are requested by the third-party data recipients and participated in by the user. The method further includes, in response to receiving the second user inputs, generating a virtual token that is configured to map a virtual token identifier to (i) resource exchange event processing data associated with the user, and (ii) the resource exchange event processing metadata. In addition, the method includes communicating (i) the virtual token to the third-party data recipient, and (ii) mapping data associated with the virtual token to a virtual token mapping database.

In specific embodiments the computer-implemented method further includes receiving a third user input that defines the third-party data recipient or receiving a request from the third-party data recipient for distribution of the resource exchange event data associated with the user.

In other specific embodiments of the computer-implemented method, receiving the one or more second user inputs further includes receiving the one or more second user inputs that define the resource exchange event processing metadata, which defines at least one of (i) an expiration date for processing resource exchange events, (ii) a time period for processing resource exchange events, (iii) a frequency for processing resource exchange events, (iv) a volume of resource exchange events allowed to be processed, (v) a specific volume of resources to be processed in a resource exchange event, (vi) a minimum volume of resources to be processed in a resource exchange event, (vii) a maximum volume of resources to be processed in a resource exchange event, (viii) a specific resource receiver or specific type of resource receiver for receiving the resources in a resource exchange event, and (ix) a specific object or service or specific type of object or service being received by the user in a resource exchange event.

In other specific embodiments the computer-implemented method further includes receiving, from the third-party data recipient, a resource exchange event request including the virtual token and accessing the virtual token mapping database to identify (i) the user, (ii) the resource exchange event processing data associated with the user, and (iii) the resource exchange event processing metadata. In addition, the computer-implemented method includes determining whether the request resource exchange event request meets the resource exchange event processing metadata, and in response to determining that the resource exchange event request meets the resource exchange event processing metadata, (i) distributing resource exchange event data to the third-party data recipient and, (ii) authorizing processing of the resource exchange event using the resource exchange event processing data. In related embodiments the computer-implemented method further includes, in response to determining that the resource exchange event request does not meet the resource exchange event processing metadata, at least one chosen from the group of (i) determining whether to authorize the processing of the resource exchange event; and (ii) implementing procedures to determine why the resource exchange event request does not meet the resource exchange event processing metadata.

A computer program product including a non-transitory computer-readable medium defines third embodiments of the invention. The computer-readable medium includes a first set of codes for causing a computer to, in response to verify an identity of a user, receiving a first user input that is configured to authorize a resource holding entity to distribute resource exchange event data associated with the user to a third-party data recipient. In addition, the computer-readable medium includes a second set of codes for causing a computer to receive one or more second user inputs that define resource exchange event processing metadata for conducting one or more user resource exchange events that are requested by the third-party data recipients and participated in by the user. In addition, the computer-readable medium includes a third set of codes for causing a computer to, in response to receiving the second user inputs, generate a virtual token that is configured to map a virtual token identifier to (i) resource exchange event processing data associated with the user, and (ii) the resource exchange event processing metadata, and a fourth set of codes for causing a computer to communicate (i) the virtual token to the third-party data recipient, and (ii) mapping data associated with the virtual token to a virtual token mapping database.

In specific embodiments of the computer program product, the computer-readable medium further comprises a fifth set of codes for causing a computer to receive a third user input that defines the third-party data recipient or receive a request from the third-party data recipient for distribution of the resource exchange event data associated with the user.

In other specific embodiments of the computer program product, the third set of codes are further configured to cause the computer to receive the one or more second user inputs that define the resource exchange event processing metadata, which defines at least one of (i) an expiration date for processing resource exchange events, (ii) a time period for processing resource exchange events, (iii) a frequency for processing resource exchange events, (iv) a volume of resource exchange events allowed to be processed, (v) a specific volume of resources to be processed in a resource exchange event, (vi) a minimum volume of resources to be processed in a resource exchange event, (vii) a maximum volume of resources to be processed in a resource exchange event, (viii) a specific resource receiver or specific type of resource receiver for receiving the resources in a resource exchange event, and (ix) a specific object or service or specific type of object or service being received by the user in a resource exchange event.

In still further specific embodiments of the computer program product, the computer-readable medium further includes a fifth set of codes for causing a computer to receive, from the third-party data recipient, a resource exchange event request including the virtual token and a sixth set of codes for causing a computer to access the virtual token mapping database to identify (i) the user, (ii) the resource exchange event processing data associated with the user, and (iii) the resource exchange event processing metadata. In addition, the computer-readable medium includes a seventh set of codes for causing a computer to determine whether the request resource exchange event request meets the resource exchange event processing metadata, and an eighth set of codes for causing a computer to, in response to determining that the resource exchange event request meets the resource exchange event processing metadata, (i) distribute resource exchange event data to the third-party data recipient and, (ii) authorize processing of the resource exchange event using the resource exchange event processing data. In related embodiments of the computer program product, the computer-readable medium further includes a ninth set of codes for causing a computer to in response to determining that the resource exchange event request does not meet the resource exchange event processing metadata, at least one chosen from the group of (i) determine whether to authorize the processing of the resource exchange event; and (ii) implement procedures to determine why the resource exchange event request does not meet the resource exchange event processing metadata.

Thus, according to embodiments of the invention, which will be discussed in greater detail below, the present invention provides for securely sharing/distributing a user's resource exchange event information with third-party data recipients. Specifically, in response to verifying the identity of a user and receiving the user's consent to distribute the resource exchange event information, user inputs are received that define resource exchange event metadata/criteria and a resource exchange event token is generated that maps a token identifier to both the resource exchange event processing data and the defined resource exchange event metadata. The token is communicated to and stored by a predetermined third-party data recipient, which presents the token at the time of requesting the processing of a resource exchange event on behalf of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for using tokenization to be able to obfuscate the sharing/distributing a user's resource exchange event information with third-party data recipients. Specifically, in response to verifying the identity of a user and receiving the user's consent to distribute the resource exchange event information, user inputs are received that define resource exchange event metadata, otherwise referred to as criteria and a resource exchange event token is generated that maps a token identifier to both the resource exchange event processing data and the defined resource exchange event metadata. The token is communicated to and stored by a predetermined third-party data recipient, which presents the token at the time of requesting the processing of a resource exchange event on behalf of the user. In this regard, the third-party data recipient never possesses the actual user's resource exchange event processing information. Moreover, since the token is tied to specific use metadata/criteria, any resource exchange event requested by third-party data recipient must meet the defined resource exchange event metadata in order for the resource exchange event to be authorized.

The resource exchange event processing metadata/criteria may be associated with time constraints, volume of resource constraints, frequency of resource exchange events, type of objects/services associated with a resource exchange event, resource exchange event party or type of party and the like.

As a result of the present invention, since the actual user's resource exchange event processing information is not communicated to the third party data recipient, the likelihood of compromise of the user's resource exchange event processing information is greatly diminished, if not eliminated. In this regard, if the token is determined to have been comprised, it may be possible to only replace the token itself, without the need to replace the resource exchange event processing information that is merely mapped to the token. Moreover, if a wrongdoer in possession of token attempts to process a resource exchange event using the token, the processing is likely to be denied since the request is unlikely to meet the criteria defined by the resource exchange event metadata.

Figure 1:
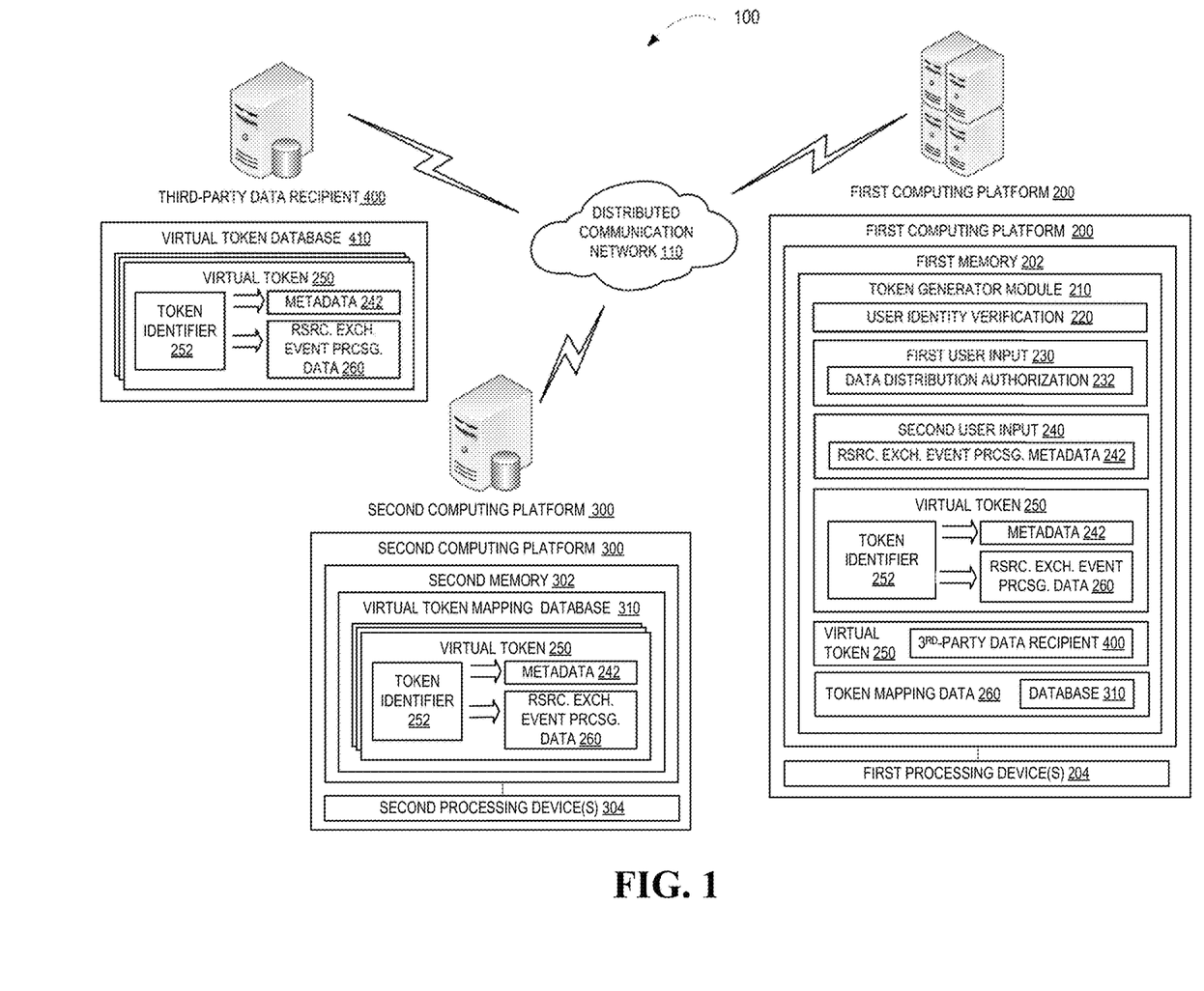
FIG. 1 is a schematic/block diagram of a system for tokenization of resource exchange event information, in accordance with embodiments of the present invention.

Referring to FIG. 1, shown is a system 100 for tokenization of resource exchange event information, in accordance with embodiments of the present invention. The system 100 operates within a distributed communication network, which may comprise the Internet, one or more intranets, one or more cellular networks and the like. System 100 includes first computing platform 200 having a first memory 202 and one or more first processing devices 204 in communication with first memory 202. First memory 202 stores token generator module 210 that is executable by at least one of the first processing device(s) 204. Token generator module is configured to, in response to user identity verification 210, receive a first user input 230 that is configured to provide resource exchange data distribution authorization 232 (i.e., consent) to a resource holding entity to distribute/share resource exchange event data that is associated with the user to a third-party data recipient 400.

Further, token generator module 210 is configured to receive one or more second user inputs 240 that define resource exchange event processing metadata 242 (i.e., criteria for conducting a resource exchange event requested by the third-party data recipient 400 in which the user is a participant). As will be discussed in more detail in relation to FIG. 3, infra., resource exchange event processing metadata 242 may be associated with the lifespan of the generated token, the frequency of token use, the volume of resources that can be exchanged in a resource exchange event, the resource recipient that be a party to a resource exchange event and/or the objects/services that can be exchanged in the resource exchange event.

In response to receiving the second user inputs 240, token generator module 210 is configured to generate a virtual token that maps a token identifier 252 to resource exchange event processing data 260 associated with the user and the resource exchange event processing metadata 242. Subsequently, token generator module 210 is configured to initiate electronic communication of the virtual token 250 to the third-party data recipient, which is configured to store the virtual token 250 in virtual token database 410.

System 100 additionally includes second computing platform 300 having a second memory 302 and one or more second processing devices 304 in communication with second memory 302. Second memory 302 stores virtual token mapping database 310 that is configured to receive token mapping data 260 communicated from the token generator module 210 of the first computing platform 200 and store the token mapping data 260 in the token mapping database 310. Specifically, the virtual token mapping database 310 stores a mapping of virtual identifiers 252 to resource exchange event processing data 260 associated with a plurality of users and resource exchange event processing metadata 242 defined by each of the plurality of users for a corresponding third-party data recipient.

Figure 2:
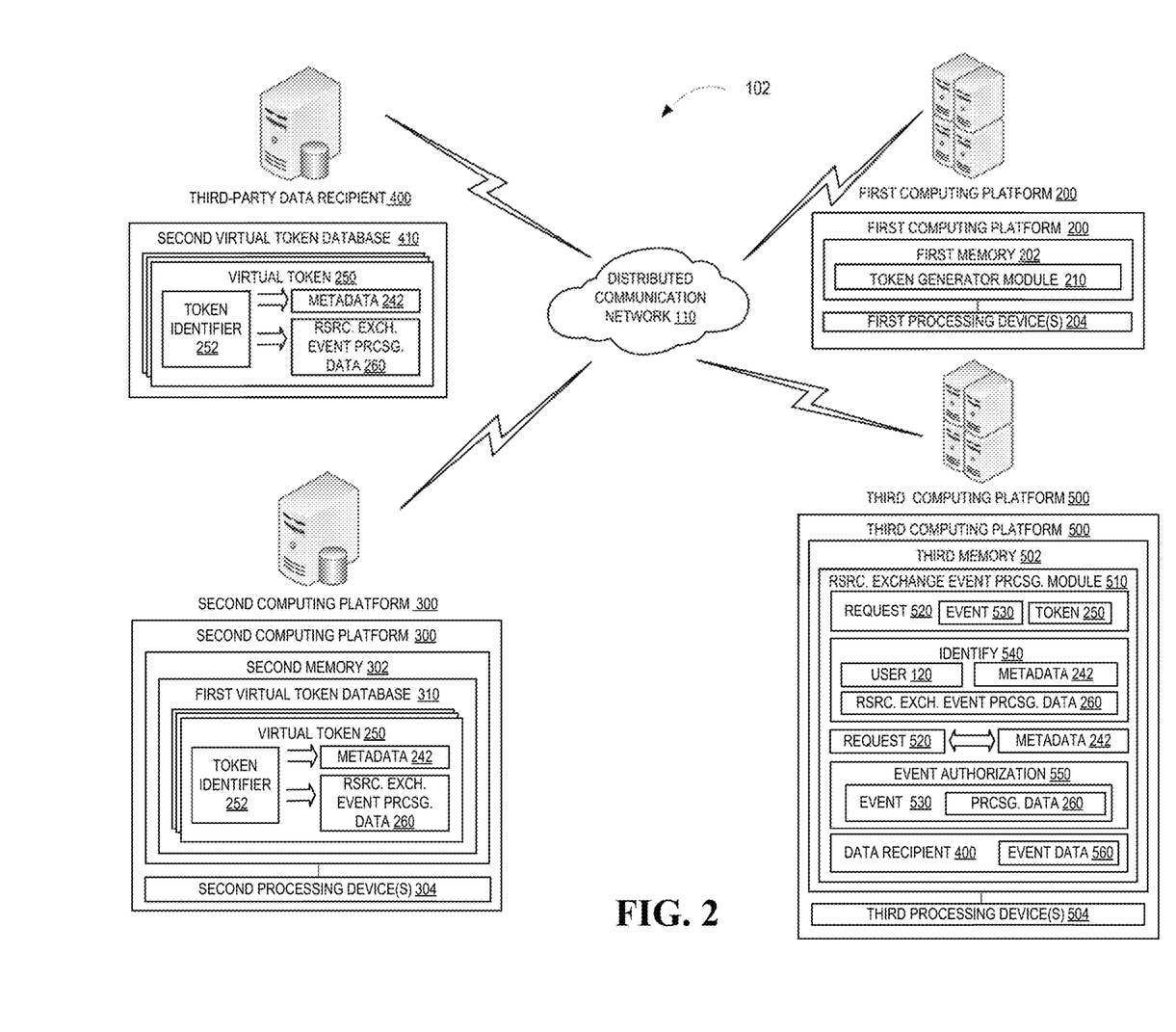
FIG. 2 is a schematic/block diagram of an alternate system for tokenization of resource exchange event information and subsequent presentation of the token for initiating processing of a resource exchange event, in accordance with some embodiments of the present disclosure.

Referring to FIG. 2, shown is an alternate system 102 for tokenization of resource exchange event information and subsequent presentation of the token for initiating processing of a resource exchange event, in accordance with alternate embodiments of the present invention. The system 102 includes the first and second computing platforms 200, 300 discussed in relation to FIG. 1. In this regard, the token generator module 210 is configured to generate a virtual token 250 and initiate communication of the virtual token 250 to a third-party data recipient 400. As previously discussed, the virtual token 250 maps a token identifier 252 to both resource exchange event processing data 260 and user-defined resource exchange event processing metadata 242 that is specific to the third-party data recipient 400.

Additionally, system 102 includes third computing platform 500 having a third memory 502 and one or more third processing devices 504 in communication with the third memory 502. Third memory 502 stores resource exchange event processing module 510 that is configured to receive a resource exchange event request 520 from the third-party data recipient 400 that requests a resource exchange event 530 and includes the virtual token 250. In response to receiving the request 520, resource exchange event processing module 510 accesses the virtual token mapping database 310 to identify 540 the user 120, the resource exchange event processing data 260 tied to the token 250 and the resource exchange event processing metadata 242 tied to the token 250. In response to identifying 540 the metadata/criteria 242, the resource exchange event processing module 510 is configured to determine whether the resource exchange event request 520 meets the resource exchange event processing metadata/criteria 242. For example, if the metadata 242 tied to the token 250 defines lifespan or frequency metadata/criteria 242, a determination is made as to whether the request meets the defined lifespan or frequency metadata/criteria 242.

In response to determining that the resource exchange event request meets the resource exchange event processing metadata 242, resource exchange event processing module 510 is configured to authorize 550 processing of the resource exchange event 530 using the resource exchange event processing data 260 tied to the token 250 and distribute resource exchange event data 560 to the third-party data recipient 400. In further embodiments of the system 102, in response to determining that the resource exchange event request 520 does not meet the resource exchange event processing metadata 242, resource exchange event processing module 510 is configured to deny processing of the resource exchange event 530 or make further inquiries to determine whether to authorize the processing of the resource exchange event 530. Moreover, in further embodiments of the system 102, in response to determining that the resource exchange event request 520 does not meet the resource exchange event processing metadata 242, resource exchange event processing module 510 is configured to implement procedures to determine why resource exchange event request 520 does not meet the resource exchange event processing metadata 242.

Figure 3:
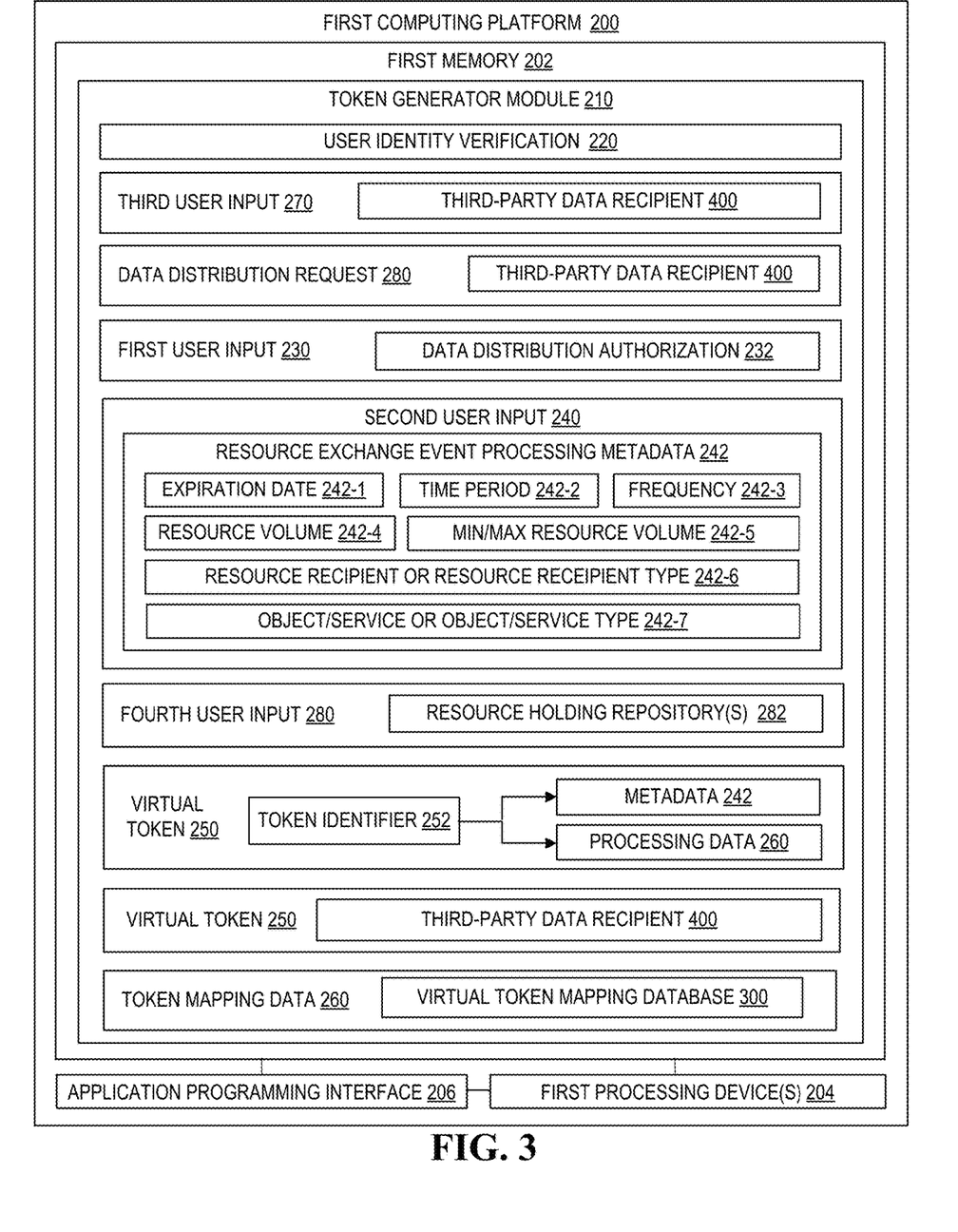
FIG. 3 is a block diagram of a first computing device configured for token generation, in accordance with some embodiments of the present disclosure.

Referring to FIG. 3, a block diagram is presented of first computing platform 200 configured for tokenization of resource exchange event information, in accordance with embodiments of the present invention. In addition to providing greater details of the first computing platform 200, FIG. 3 highlights various alternate embodiments of the invention. First computing platform 200 may comprise one or multiple devices, such as servers or the like. First computing platform 200 includes first memory 202, which may comprise volatile and/or non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 includes one or more first processing devices 204, which may be an application-specific integrated circuit ("ASIC"), or other chipset, logic circuit, or other data processing device. First processing device(s) 204 may execute one or more application programming interface (APIs) 206 that interface with any resident programs, such as token generator module 210 or the like, stored in first memory 202 of first computing platform 200 and any external programs. First processing devices(s) 204 may include various processing subsystems (not shown in FIG. 3) embodied in hardware, firmware, software, and combinations thereof, that enable the functionality of first computing platform 200 and the operability of first computing platform 200 on a network, such as the Intranet, intranet(s), cellular network(s) and the like. For example, processing subsystems allow for initiating and maintaining communications and exchanging data with other networked devices. For the disclosed aspects, processing subsystems of first computing platform 200 may include any subsystem used in conjunction with token generator module 210 and related tools, routines, sub-routines, algorithms, sub-algorithms, sub-modules thereof.

In specific embodiments of the present invention, first computing platform 200 may additionally include a communications module (not shown in FIG. 3) embodied in hardware, firmware, software, and combinations thereof, that enables electronic communications between the first computing platform 200 and other networks and network devices, such as second computing platform 300, third computing platform 500, third-party data recipient 400 and the like. Thus, communication module may include the requisite hardware, firmware, software and/or combinations thereof for establishing and maintaining a network communication connection with one or more devices and/or networks.

First memory 202 of first computing platform 200 stores token generator module 210. In specific embodiments of the invention, in which token generator 210 is implemented by a financial institution for purposes of allowing a third-party, such as a Fintech mobile application (e.g., payment, budgeting, management or the like) or the like to request financial transactions on behalf of a user, token generator 210 may be incorporated within a financial institution's web-based platform and/or mobile application.

As previously discussed, token generator module 210 is configured to, in response to user identity verification 210, receive a first user input 230 that is configured to provide resource exchange data distribution authorization 232 (i.e., consent) to a resource holding entity to distribute/share resource exchange event data that is associated with the user to a third-party data recipient 400. In those embodiments of the invention, in which the token generator module 210 is implemented within a financial institution web-based platform and/or mobile application, user identity verification 220 may include entering a username/passcode and or presenting biometric data (e.g., fingerprint, facial characteristics) to gain entry to the user's financial institution web-based platform account and/or mobile application account. Further, the providing of resource exchange data distribution authorization 232 (i.e., consent) to a resource holding entity may comprise the user providing consent for a financial institution to share the user's account information, such as Automated Clearing House (ACH) payment credentials (i.e., account and routing information) or the like with FinTech application (i.e., third-party data recipient) or other entity configured to submit transactions requests on behalf of the user/account holder.

In specific embodiments of the invention, prior to receiving the first user input 230, token generator module 210 is configured to receive a third user input 270 that defines the third-party data recipient 400. While in other embodiments of the invention, prior to receiving the first user input 230, token generator module 210 is configured to receive a data distribution request 280 from the third-party data recipient 400. In this regard, either the user can identify the third-party data recipient or the third party data recipient can request access to/sharing of the user's resource exchange event processing data. Thus, in specific embodiments of the invention, in which the resource exchange event is a financial transaction, the user/account holder can input/identify the third-party, such as FinTech mobile application or the like or the third-party such as FinTech mobile application or the like can submit requests to the system and, in response, the user/account holder can confirm the requests.

Further, token generator module 210 is configured to receive one or more second user inputs 240 that define resource exchange event processing metadata 242 (i.e., criteria for conducting a resource exchange event requested by the third-party data recipient 400 in which the user is a participant). In specific embodiments of the invention, in which the resource exchange event is a financial transaction (i.e., payment transaction, transfer transaction or the like), metadata 242 defines criteria required using the virtual token 250 to initiate the financial transaction.

The metadata 242 may include lifespan data, such as, but not limited to, an expiration date 242-1 for the token 250, and a time period 242-2 for use of the token 250 (e.g., start and/or stop date for using the token 250). In addition, metadata 242 may include frequency data 242-3, such as, but not limited to, a specified number of times that the token may be used, a specified number of times that the token may be used over a designated time period (e.g., once a month or the like). Additionally, metadata 242 may include resource volume data, such as but not limited to, a specific resource volume/amount 242-4 (e.g., specific payment amount), or minimum and/or maximum resource volume/amount 242-5 (e.g., minimum and/or maximum payment amount). Moreover, metadata 242 may include resource recipient data 242-6, such as, but not limited to, specific resource recipient (e.g., specific payee) or specific type of resource recipient (e.g., specific type/classification of payee) and/or object/service data 242-7, such as, but not limited to, specific object/services (e.g., products or services) or specific types of objects/services that can be transacted for using the token.

In further specific embodiments of the invention, token generator module 210 is configured to receive a third user input 270 that defines a specific resource holding repository 282 for the resource exchange event processing data 260 or multiple resource holding repositories 282 in ranked order of preference.

In response to receiving the second user inputs 240, token generator module 210 is configured to generate a virtual token 250 that maps a token identifier 252 to resource exchange event processing data 260 associated with the user and the resource exchange event processing metadata 242. In specific embodiments of the invention, the virtual token 250 maps the token identifier 252 to payment processing data, such as ACH data (e.g., account number, routing number and the like) and payment processing metadata.

Subsequently, token generator module 210 is configured to initiate electronic communication of the virtual token 250 to the third-party data recipient, such as a FinTech mobile application or other financial payment, budgeting or management entity which is configured to store the virtual token 250 in virtual token database 410. Additionally, token generator module 210 is configured to initiate electronic communication of token mapping data 260 to an internal virtual token mapping database 300.

Figure 4:
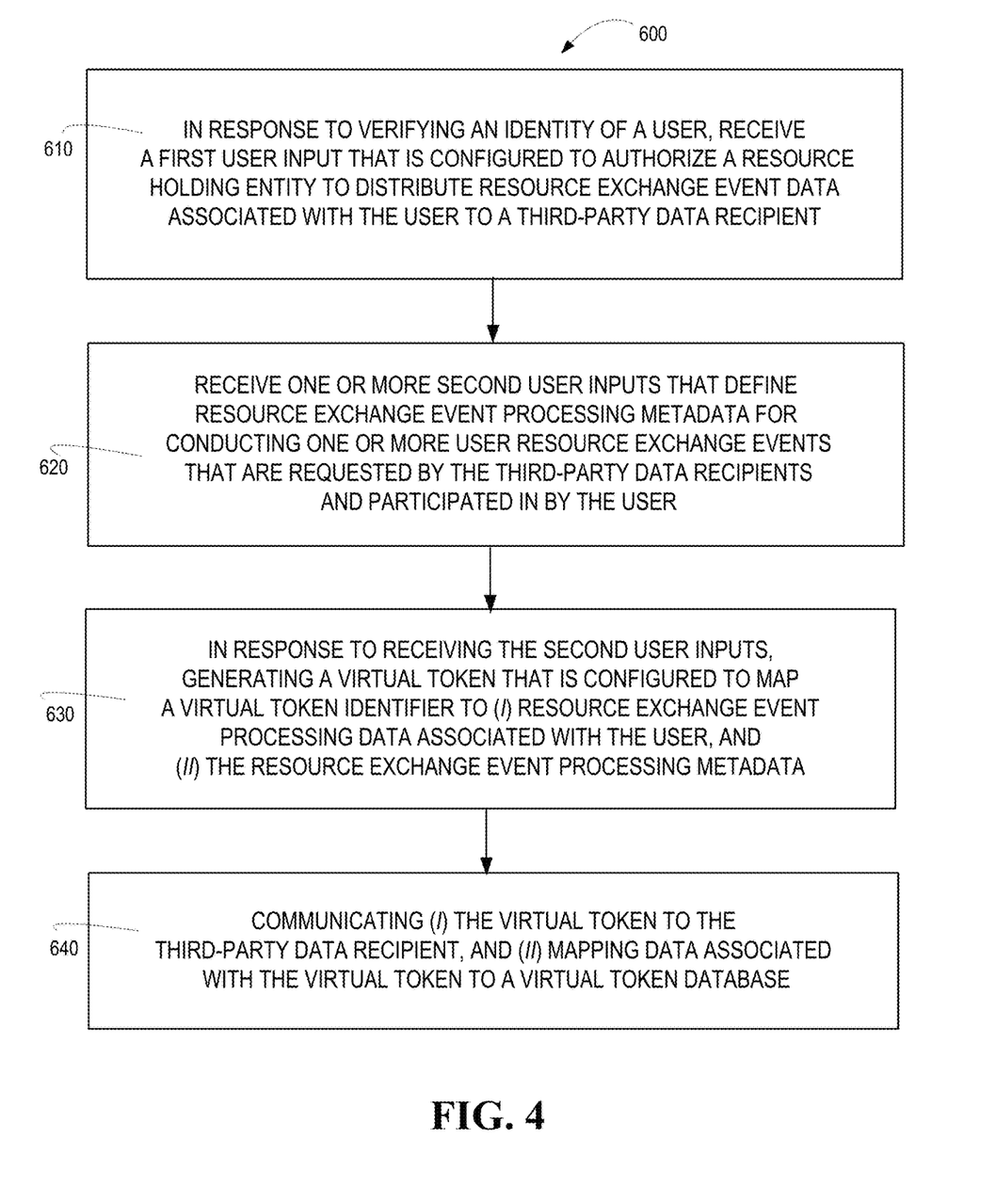
FIG. 4 is a flow diagram of a computer-implemented method for tokenization of resource exchange event information, in accordance with embodiments of the present invention.

Referring to FIG. 4, a flow diagram is depicted of a method 600 for tokenization of resource exchange event information, in accordance with embodiments of the present invention. At Event 610, in response to verifying the identity of user (e.g., account holder), a first user input is received that is configured to authorize a resource holding entity (e.g., a financial institution) to distribute/share the user's resource exchange event data (e.g., payment data, such as ACH data, RTP data or the like) with a third-party data recipient (e.g., FinTech mobile application or other payment, budgeting or financial management applications or service).

At Event 620, one or more second user inputs are received that define resource exchange event processing metadata/criteria for processing a resource exchange event requested by the third-party data recipient. As previously discussed, the metadata may include, but is not limited to, the longevity or period of use of the associated virtual token, the frequency of use of the virtual token, the volume of resources that can be used for conducting a resource exchange event using the virtual token, the resource receiver (e.g., payee) for conducting a resource exchange event using the virtual token and/or the object(s)/service(s) that can be exchanged in a resource exchange event using the virtual token.

In response to receiving the second user inputs, at Event 630, a virtual token is generated that is configured to map a virtual token identifier to (i) the user's resource exchange event data (e.g., payment data, such as ACH data, RTP data or the like) and (ii) the user-specified metadata. At Event 640, the virtual token is communicated to the third-party data recipient and mapping data is communicated to an internal token mapping database that maps the token identifiers to the corresponding (i) the user's resource exchange event data and (ii) the user-specified metadata.

Subsequently, when the third-party data recipient is prompted to perform a financial transaction on behalf of the user, the third-party data recipient submits a resource exchange event request to the resource holding entity (e.g., the financial institution that issued the virtual token) that includes the virtual token. The token mapping database is accessed to identify (i) the user's resource exchange event data and (ii) the user-specified metadata and a determination is made as to whether the parameters of the resource exchange event request meet the metadata/criteria associated with the token. If the resource exchange event request parameters meet the token metadata, the resource exchange event is authorized for processing and, if the resource exchange event request parameters do not meet the token metadata, the resource exchange event may be denied or further investigation may ensue to determine why the resource exchange event request parameters do not meet the token metadata and to ultimately decide whether to authorize or dent the resource exchange event.

Thus, present embodiments of the invention provide devices, methods, computer program products and/or the like for securely sharing/distributing a user's resource exchange event information with third-party data recipients. Specifically, in response to verifying the identity of a user and receiving the user's consent to distribute the resource exchange event information, user inputs are received that define resource exchange event metadata/criteria and a resource exchange event token is generated that maps a token identifier to both the resource exchange event processing data and the defined resource exchange event metadata. The token is communicated to and stored by a predetermined third-party data recipient, which presents the token at the time of requesting the processing of a resource exchange event on behalf of the user.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for distributing resource exchange event data to third-party data recipients, the system comprising:
a first computing platform having a first memory and one or more first computing processor devices in communication with the first memory, wherein the first memory stores a token generator module that is executable by at least one of the one or more first computing processing devices and configured to:
in response to verifying an identity of a user, receive a first user input that is configured to authorize a resource holding entity to distribute resource exchange event data associated with the user to a third-party data recipient, receive one or more second user inputs that define resource exchange event processing metadata for conducting one or more user resource exchange events that are requested by the third-party data recipients and participated in by the user, receive third inputs that defines a plurality of resource holding repositories ranked in terms of user preference, wherein resource exchange event processing data associated with the user is configured to include a plurality of identifiers, each identifier associated with one of the plurality of resource holding repositories, in response to receiving the third user inputs, generate a virtual token that is configured to map a virtual token identifier to (i) the resource exchange event processing data including the plurality of identifiers, and (ii) the resource exchange event processing metadata, and communicate (i) the virtual token to the third-party data recipient, and (ii) mapping data associated with the virtual token to a virtual token mapping database;

a second computing platform having a second memory and one or more second computing processor devices in communication with the second memory, wherein the second memory stores the virtual token mapping database that is configured to receive the mapping data and maintain a database that stores a mapping of virtual token identifiers to (i) resource exchange event processing data associated with a plurality of users, and (ii) the resource exchange event processing metadata defined by each of the plurality of users for a corresponding third-party data recipient; and a third computing platform having a third memory and one or more third computing processor devices in communication with the third memory, wherein the third memory stores a resource exchange event processing module that is executable by at least one of the one or more third computing processing devices and configured to:

receive, from the third-party data recipient, a resource exchange event request in which the user is a participant, wherein the request comprises the virtual token, access the virtual token mapping database to identify (i) the user, (ii) the resource exchange event processing data associated with the user, and (iii) the resource exchange event processing metadata, determine whether the request resource exchange event request meets the resource exchange event processing metadata, in response to determining that the resource exchange event request meets the resource exchange event processing metadata, (i) distribute resource exchange event data to the third-party data recipient and, (ii) authorize processing of the resource exchange event using the resource exchange event processing data, and in response to determining that the resource exchange event request does not meet the resource exchange event processing metadata, implement procedures to determine why the resource exchange event request does not meet the resource exchange event processing metadata.

2. The system of claim 1, wherein the token generator module is further configured to (i) receive a fourth user input that defines the third-party data recipient, or (ii) receive a request from the third-party data recipient for distribution of the resource exchange event data associated with the user.

3. The system of claim 1, wherein the token generator module is further configured to generate the virtual token, wherein the virtual token is specific to a resource exchange event processing network associated with the third-party data recipient.

4. The system of claim 1, wherein the token generator module is further configured to receive the one or more second user inputs that define the resource exchange event processing metadata, wherein the resource exchange event processing metadata defines at least one of (i) an expiration date for processing resource exchange events, (ii) a time period for processing resource exchange events, (iii) a frequency for processing resource exchange events, and (iv) a volume of resource exchange events allowed to be processed.

5. The system of claim 1, wherein the token generator module is further configured to receive the one or more second user inputs that define the resource exchange event processing metadata, wherein the resource exchange event processing metadata defines at least one of (i) a specific volume of resources to be processed in a resource exchange event, (ii) a minimum volume of resources to be processed in a resource exchange event, and (iii) a maximum volume of resources to be processed in a resource exchange event.

6. The system of claim 1, wherein the token generator module is further configured to receive the one or more second user inputs that define the resource exchange event processing metadata, wherein the resource exchange event processing metadata defines at least one of (i) a specific resource receiver or specific type of resource receiver for receiving the resources in a resource exchange event, and (ii) a specific object or service or specific type of object or service being received by the user in a resource exchange event.

7. The system of claim 1, wherein the resource exchange event processing module is further configured to:

in response to determining that the resource exchange event request does not meet the resource exchange event processing metadata, determine whether to authorize the processing of the resource exchange event.

8. A computer-implemented method for distributing resource exchange event data to third-party data recipients, the computer-implemented method is executed by one or more computing processor devices and comprises:

in response to verifying an identity of a user, receiving a first user input that is configured to authorize a resource holding entity to distribute resource exchange event data associated with the user to a third-party data recipient;

receiving one or more second user inputs that define resource exchange event processing metadata for conducting one or more user resource exchange events that are requested by the third-party data recipients and participated in by the user;

receiving third inputs that define a plurality of resource holding repositories ranked in terms of user preference, wherein resource exchange event processing data associated with the user is configured to include a plurality of identifiers, each identifier associated with one of the plurality of resource holding repositories;

in response to receiving the third user inputs, generating a virtual token that is configured to map a virtual token identifier to (i) the resource exchange event processing data including the plurality of identifiers, and (ii) the resource exchange event processing metadata;

communicating (i) the virtual token to one of the third-party data recipients, and (ii) mapping data associated with the virtual token to a virtual token mapping database;

receiving, from the one of the third-party data recipients, a resource exchange event request in which the user is a participant, wherein the request comprises the virtual token;

accessing the virtual token mapping database to identify (i) the user, (ii) the resource exchange event processing data associated with the user, and (iii) the resource exchange event processing metadata;

determining whether the request resource exchange event request meets the resource exchange event processing metadata;

in response to determining that the resource exchange event request meets the resource exchange event processing metadata, (i) distributing resource exchange event data to the third-party data recipient and, (ii) authorizing processing of the resource exchange event using the resource exchange event processing data; and in response to determining that the resource exchange event request does not meet the resource exchange event processing metadata, implementing procedures to determine why the resource exchange event request does not meet the resource exchange event processing metadata.

9. The computer-implemented method of claim 8, further comprising:
receiving a fourth user input that defines the third-party data recipient, or
receiving a request from the third-party data recipient for distribution of the resource exchange event data associated with the user.

10. The computer-implemented method of claim 8, wherein receiving the one or more second user inputs further comprises receiving the one or more second user inputs that define the resource exchange event processing metadata, wherein the resource exchange event processing metadata defines at least one of (i) an expiration date for processing resource exchange events, (ii) a time period for processing resource exchange events, (iii) a frequency for processing resource exchange events, (iv) a volume of resource exchange events allowed to be processed, (v) a specific volume of resources to be processed in a resource exchange event, (vi) a minimum volume of resources to be processed in a resource exchange event, (vii) a maximum volume of resources to be processed in a resource exchange event, (viii) a specific resource receiver or specific type of resource receiver for receiving the resources in a resource exchange event, and (ix) a specific object or service or specific type of object or service being received by the user in a resource exchange event.

11. The computer-implemented method of claim 8, further comprising:
in response to determining that the resource exchange event request does not meet the resource exchange event processing metadata,
determining whether to authorize the processing of the resource exchange event.

12. A computer program product comprising:
a non-transitory computer-readable medium comprising:

a first set of codes for causing a computer to, in response to verify an identity of a user, receiving a first user input that is configured to authorize a resource holding entity to distribute resource exchange event data associated with the user to a third-party data recipient;

a second set of codes for causing a computer to receive one or more second user inputs that define resource exchange event processing metadata for conducting one or more user resource exchange events that are requested by the third-party data recipients and participated in by the user;

a third set of codes for causing a computer to receive third inputs that define a plurality of resource holding repositories ranked in terms of user preference, wherein resource exchange event processing data associated with the user is configured to include a plurality of identifiers, each identifier associated with one of the plurality of resource holding repositories;

a fourth set of codes for causing a computer to, in response to receiving the third user inputs, generate a virtual token that is configured to map a virtual token identifier to (i) the resource exchange event processing data including the plurality of identifiers, and (ii) the resource exchange event processing metadata; and a fifth set of codes for causing a computer to communicate (i) the virtual token to the third-party data recipient, and (ii) mapping data associated with the virtual token to a virtual token mapping database; and a sixth set of codes for causing a computer to receive, from the third-party data recipient, a resource exchange event request in which the user is a participant, wherein the request comprises the virtual token;

a seventh set of codes for causing a computer to access the virtual token mapping database to identify (i) the user, (ii) the resource exchange event processing data associated with the user, and (iii) the resource exchange event processing metadata;

an eighth set of codes for causing a computer to determine whether the request resource exchange event request meets the resource exchange event processing metadata; and a ninth set of codes for causing a computer to, in response to determining that the resource exchange event request meets the resource exchange event processing metadata, (i) distribute resource exchange event data to the third-party data recipient and, (ii) authorize processing of the resource exchange event using the resource exchange event processing; and a tenth set of codes for causing a computer to, in response to determining that the resource exchange event request does not meet the resource exchange event processing metadata, implementing procedures to determine why the resource exchange event request does not meet the resource exchange event processing metadata.

13. The computer program product of claim 12, wherein the computer-readable medium further comprises an eleventh set of codes for causing a computer to receive a third user input that defines the third-party data recipient or receive a request from the third-party data recipient for distribution of the resource exchange event data associated with the user.

14. The computer program product of claim 12, wherein the second set of codes are further configured to cause the computer to receive the one or more second user inputs that define the resource exchange event processing metadata, wherein the resource exchange event processing metadata defines at least one of (i) an expiration date for processing resource exchange events, (ii) a time period for processing resource exchange events, (iii) a frequency for processing resource exchange events, (iv) a volume of resource exchange events allowed to be processed, (v) a specific volume of resources to be processed in a resource exchange event, (vi) a minimum volume of resources to be processed in a resource exchange event, (vii) a maximum volume of resources to be processed in a resource exchange event, (viii) a specific resource receiver or specific type of resource receiver for receiving the resources in a resource exchange event, and (ix) a specific object or service or specific type of object or service being received by the user in a resource exchange event.

15. The computer program product of claim 12, wherein the tenth set of codes is further configured to cause the computer determine whether to authorize the processing of the resource exchange event.

\* \* \* \* \*